(12) United States Patent
Wuidart

(10) Patent No.: US 9,098,788 B2
(45) Date of Patent: Aug. 4, 2015

(54) OPTIMIZATION OF THE PROCESSING SPEED OF AN ELECTROMAGNETIC TRANSPONDER

(75) Inventor: Luc Wuidart, Pourrières (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 372 days.

(21) Appl. No.: 13/615,277

(22) Filed: Sep. 13, 2012

(65) Prior Publication Data

US 2013/0080810 A1  Mar. 28, 2013

(30) Foreign Application Priority Data

Sep. 28, 2011  (FR) ...................................... 11 58667

(51) Int. Cl.
| | | |
|---|---|---|
| *G06F 1/08* | (2006.01) | |
| *G06K 19/07* | (2006.01) | |
| *G06K 7/08* | (2006.01) | |
| *G06K 7/00* | (2006.01) | |

(52) U.S. Cl.
CPC .............. *G06K 19/0723* (2013.01); *G06F 1/08* (2013.01); *G06K 7/0008* (2013.01); *G06K 19/0701* (2013.01); *G06K 19/0712* (2013.01)

(58) Field of Classification Search
CPC .................................................. G06K 19/0723
See application file for complete search history.

(56) References Cited

U.S. PATENT DOCUMENTS

| 7,093,765 | B2 | 8/2006 | Baldischweiler et al. | |
|---|---|---|---|---|
| 2002/0097144 | A1 | 7/2002 | Collins et al. | |
| 2010/0277281 | A1* | 11/2010 | Kang | 340/10.1 |
| 2010/0321164 | A1* | 12/2010 | Wuidart | 340/10.4 |
| 2010/0323629 | A1* | 12/2010 | Wuidart | 455/67.11 |

OTHER PUBLICATIONS

French Search Report and Written Opinion dated Apr. 11, 2012 from corresponding French Application No. 11/58667.

* cited by examiner

*Primary Examiner* — Paul Yanchus, III
*Assistant Examiner* — Joshua Neveln
(74) *Attorney, Agent, or Firm* — Seed IP Law Group PLLC

(57) ABSTRACT

A method for setting the clock frequency of a processing unit of an electromagnetic transponder, wherein a ratio between data, representative of a voltage across an oscillating circuit of the transponder and obtained for two values of the resistive load, is compared with one to decide whether to increase or decrease the clock frequency of the processing unit.

17 Claims, 4 Drawing Sheets

OPTIMIZATION OF THE PROCESSING SPEED OF AN ELECTROMAGNETIC TRANSPONDER

CROSS REFERENCE TO RELATED APPLICATIONS

This application claims the priority benefit of French patent application number 11/58667, filed on Sep. 28, 2011, which is hereby incorporated by reference to the maximum extent allowable by law.

BACKGROUND

1. Technical Field

Embodiments generally relate to systems using transponders, that is, transceivers (generally mobile), capable of communicating in a contactless and wireless manner with a terminal.

Embodiments more specifically relate to the optimization of the speed of processing by digital circuits (processor) of a transponder.

2. Discussion of the Related Art

Electromagnetic transponder systems are more and more used, and transponders perform operations of increasing complexity by means of digital processing circuits (in practice, microprocessors). The emergence of mobile telecommunication devices equipped with near-field communication (NFC) routers takes part in this evolution.

It is known that the higher the operation frequency of a processor or a digital processing circuit, the higher its power consumption. It has already been provided to assess the voltage recovered by a transponder in order to deduce the power transferred from a terminal to the transponder.

The transponder however recovers a power supply voltage which depends significantly on the coupling between the terminal and the transponder, and thus on the power consumption of the transponder circuits. This coupling, which is inversely proportional (non linear) to the distance between the terminal and the transponder, conditions the amplitude of the voltage recovered by the transponder.

It is further known that a decrease in the load (transponder power consumption) causes an increase in the voltage and in the remote-supply power. According to the current value of the coupling with respect to the optimum coupling, a load decrease may result in having the coupling tends towards its critical optimum value. The transponder then is in a paradoxical situation where its circuits consume less power but where the voltage and the remote-supply power reach a maximum.

However, for the same value of the recovered voltage, there may be two different coupling situations. Accordingly, it is particularly difficult to determine at which frequency the digital circuits of the transponder are to be operated according to the measured voltage since it is actually risked, while hoping to improve the situation, to worsen it or even to place the transponder in a situation where the drop in the voltage that it receives makes it non-functional.

SUMMARY

An embodiment provides a mechanism for optimizing the processing speed of a transponder (clock frequency of the digital circuit contained therein), which overcomes all or part of the disadvantages of usual solutions.

Thus an embodiment provides a method for setting the clock frequency of a processing unit of an electromagnetic transponder, wherein a ratio between data, representative of a voltage across an oscillating circuit of the transponder and obtained for two values of the resistive load, is compared with one to decide whether to increase or decrease the clock frequency of the processing unit.

According to an embodiment, the frequency is increased if said ratio is greater than 1 and is decreased in the opposite case.

According to an embodiment:

a current value of the ratio of the current coupling factor between the transponder and a terminal to an optimum coupling factor with a first value of the resistive load is calculated and stored;

said current value is compared with one; and as long as these values are not equal, the clock frequency of the processing unit is varied within a range defined by two thresholds.

According to an embodiment, the values of said ratio are obtained as a result of the measurements:

of a first value of a D.C. voltage provided by a rectifier across an oscillating circuit of the transponder for a first value of the resistive load of this oscillating circuit; and of a second value of said voltage for a second resistive load value.

According to an embodiment, a target value $V_{C2opt]target}$ of the voltage across the oscillating circuit is calculated according to the following formula:

$$V_{C2opt]target} = \left(1 + \frac{1}{\left(\frac{k}{k_{opt]R20}}\right)^2}\right) \cdot \frac{V_{C2]R20}}{2},$$

where:

$V_{C2]R20}$ stands for said first value of the D.C. voltage;

k stands for the current value of the coupling; and $k_{opt]R20}$ stands for the value of the optimum coupling with the first resistive load value.

According to an embodiment, the resistive load variation between said two values is obtained by varying the clock frequency of the processing unit.

Another embodiment provides an electromagnetic transponder comprising:

an oscillating circuit upstream of a rectifying circuit capable of providing a D.C. voltage when the transponder is in the magnetic field of a terminal; and at least one processing unit programmed to implement the method of any of the foregoing claims.

The foregoing and other features and advantages will be discussed in detail in the following non-limiting description of specific embodiments in connection with the accompanying drawings.

DETAILED DESCRIPTION

Figure 1:
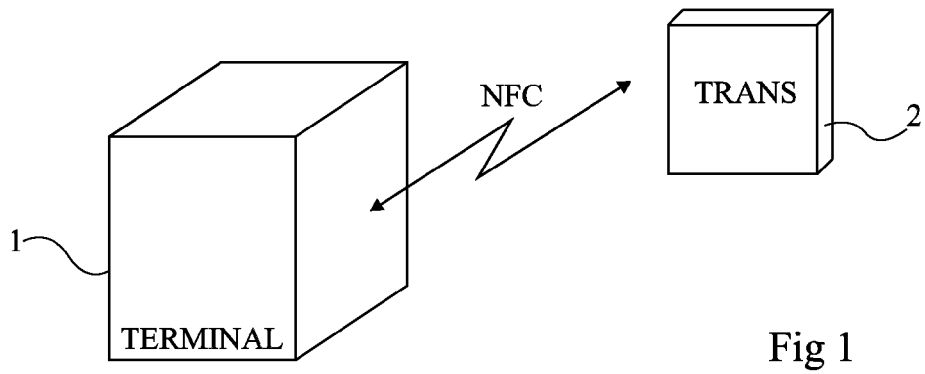
FIG. 1 very schematically shows an example of a near-field communication system.

The same elements have been designated with the same reference numerals in the different drawings. For clarity, only those steps and elements which are useful to the understanding of the described embodiments have been shown and will be detailed. In particular, the origin and the destination of the data transmitted in communications between a transponder and a terminal have not been detailed, the described embodiments being compatible with any usual communication.

FIG. 1 is a block diagram of an electromagnetic transponder communication system. A terminal 1 (TERMINAL) is capable of communicating in near field (for example, according to a near field communication protocol NFC) with a distant element, that is, a transponder (TRANS). The terminal may take different forms, for example, a transport ticket validation terminal, an electronic passport reader, a laptop computer, a mobile communication device (cell phone or smartphone, PDA, etc.), an electronic control unit for starting an automobile vehicle, etc.

Transponder 2 may also take different forms, for example, a chip card, an electronic transport ticket, an electronic passport, a telecommunication terminal (smartphone, PDA, etc.), an electronic tag, etc.

Figure 2:
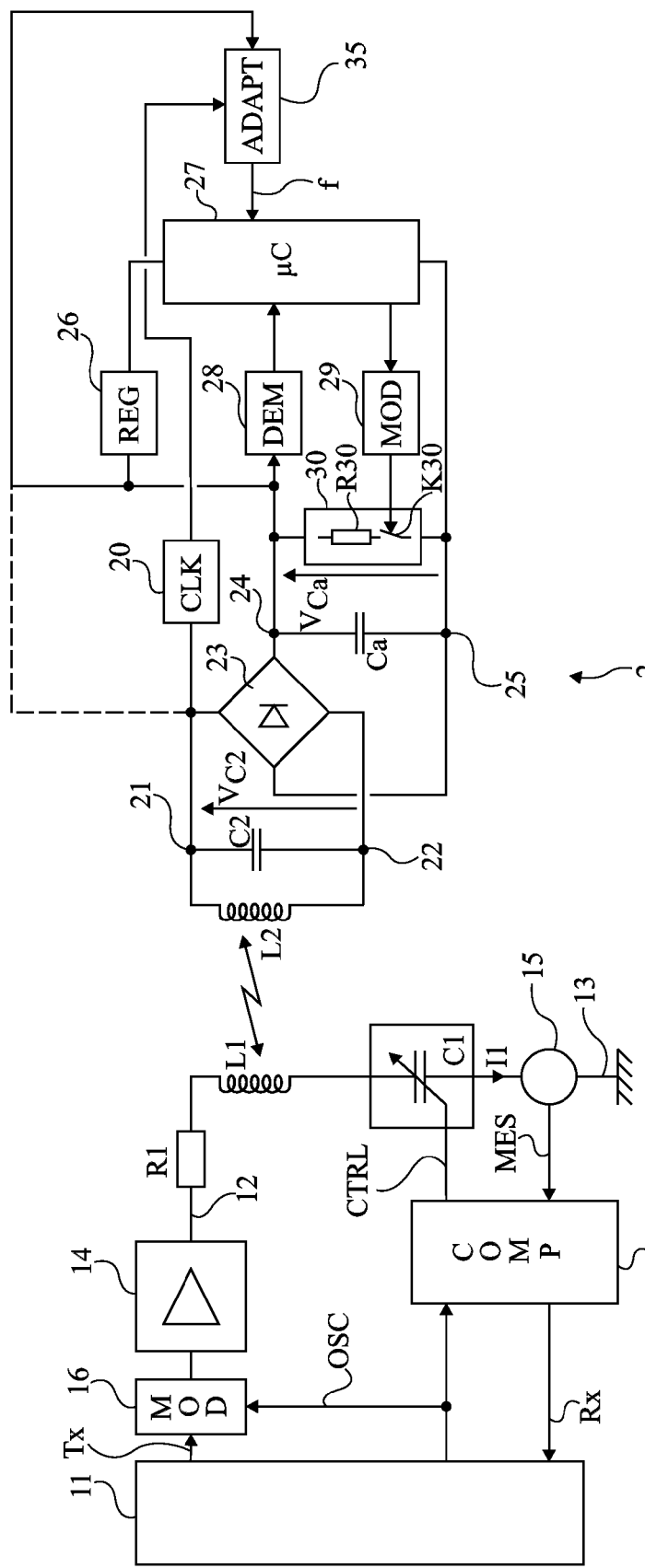
FIG. 2 is a simplified block diagram of a terminal and of a transponder of a near-field communication system.

FIG. 2 very schematically shows an example of a terminal 1 and of a transponder 2. Terminal 1 comprises a series oscillating circuit, formed of an inductance L1 in series with a capacitor C1 and a resistor R1. This series oscillating circuit is, in the example of FIG. 2, connected between an output terminal 12 of an amplifier or antenna coupler 14 and a terminal 13 at a reference voltage (generally the ground). An element 15 for measuring the current in the oscillating circuit is interposed, for example, between capacitive element C1 and ground 13. Measurement element 15 belongs to a phase regulation loop which will be described hereafter. Amplifier 14 receives a high-frequency transmission signal originating from a modulator 16 (MOD) which receives a reference frequency (signal OSC), for example, from a quartz oscillator (not shown). Modulator 16 receives, if need be, a signal Tx originating from a circuit 11 for controlling and exploiting the transmissions. Circuit 11 is generally provided with a control and data processing microprocessor, communicating with different input/output circuits (keyboard, display, elements of exchange with a server, etc.) and/or processing circuits, which have not been detailed. The elements of terminal 1 most often draw the power necessary to their operation from a supply circuit (not shown) connected, for example, to the power line distribution system or to a battery (for example, that of an automobile vehicle or of a portable telephone or computer). Modulator 16 provides a high-frequency carrier (for example, at 13.56 Megahertz) to oscillating circuit L1-C1, which generates a magnetic field.

Capacitive element C1 is, for example, a variable-capacitance element controllable by a signal CTRL. This element takes part in the phase regulation of current I1 in antenna L1 with respect to a reference signal. This regulation is a regulation of the high-frequency signal, that is, of the carrier signal corresponding to the signal provided to amplifier 14 in the absence of data Tx to be transmitted. The regulation is performed by varying capacitance C1 of the oscillating circuit of the terminal to maintain the current in antenna L1 in constant phase relationship with the reference signal. This reference signal for example corresponds to signal OSC provided to modulator 16. Signal CTRL originates from a circuit 17 (COMP) having the function of detecting the phase interval with respect to the reference signal and of accordingly modifying the capacitance of element C1. Comparator 17 receives data MES relative to current I1 in the oscillating circuit, detected by measurement element 15 (for example, an intensity transformer or a resistor).

A transponder 2, capable of cooperating with terminal 1, comprises an oscillating circuit, for example, parallel, formed of an inductance L2 in parallel with a capacitor C2 between two terminals 21 and 22. The parallel oscillating circuit (called receive mode resonant circuit) is intended to capture a magnetic field generated by oscillating circuit L1-C1 of terminal 1. Circuits L2-C2 and L1-C1 are tuned to a same resonance frequency (for example, 13.56 Megahertz). Terminals 21 and 22 are connected to two A.C. input terminals of a rectifying bridge 23 (most often, fullwave). The rectified output terminals of bridge 23 respectively define a positive terminal 24 and a reference terminal 25. A capacitor Ca is connected between terminals 24 and 25 to smooth the rectified voltage. The recovered power is used to recharge a battery, not shown.

When transponder 2 is in the field of terminal 1, a high-frequency voltage is generated across resonant circuit L2-C2. This voltage, rectified by bridge 23 and smoothed by capacitor Ca, provides a supply voltage to electronic circuits of the transponder via a voltage regulator 26 (REG). Such circuits generally comprise a processing unit 27 (for example, a microcontroller μC) associated with a memory (not shown), a demodulator 28 (DEM) of the signals that may have been received from terminal 1, and a modulator 29 (MOD) for transmitting the data to the terminal. The transponder is generally synchronized by means of a clock CLK extracted, by a block 20, from the high-frequency signal recovered, before rectification, from one of terminals 21 and 22. Most often, all the electronic circuits of the transponder are integrated in a same chip.

In the embodiment of FIG. 2, operating frequency f of the microcontroller is set by a circuit 35 (ADAPT) using the frequency extracted by circuit 20 as well as an image of voltage $V_{C2}$ across circuit L2-C2. This image originates, for example, from voltage $V_{Ca}$ or (variation illustrated in dotted lines in FIG. 2) a direct measurement of the voltage upstream of rectifying bridge 23. The function of matching circuit 35 will be discussed hereinafter in relation with FIGS. 4 and 5.

To transmit data from terminal 1 to transponder 2, circuit 16 modulates (generally in amplitude) the carrier (signal OSC) according to signal Tx. On the transponder side, these data are demodulated by demodulator 28 based on voltage $V_{Ca}$ across capacitor Ca. The demodulator may sample the signal to be demodulated upstream of the rectifying bridge.

To transmit data from transponder 2 to terminal 1, modulator 29 controls a stage 30 of modulation (retromodulation) of the load formed by the transponder circuits on the magnetic field generated by the terminal. This stage is generally formed of an electronic switch K30 (for example, a transistor) and of a resistor R30 (or a capacitor), in series between terminals 24 and 25. Switch K30 is controlled at a so-called sub-carrier frequency (for example, 847.5 kilohertz), much lower (generally with a ratio of at least 10) than the frequency of the excitation signal of the oscillating circuit of terminal 1. When switch K30 is on, the oscillating circuit of the transponder is submitted to an additional damping with respect to the load formed by circuits 20, 26, 27, 28, and 29 so that the transponder samples a greater amount of power from the high-frequency magnetic field. On the side of terminal 1, amplifier 14 maintains the amplitude of the high-frequency excitation signal at a constant level. Accordingly, the power variation of the transponder translates as an amplitude and phase variation of the current in antenna L1. This variation is detected by an amplitude or phase demodulator of the terminal. In the embodiment illustrated in FIG. 2, comparator 17 integrates a phase demodulator also used to demodulate the signal originating from the transponder. Accordingly, comparator 17 provides a signal Rx returning to circuit 11 a possible retromodulation of data received from a transponder. Other demodulation circuits may be provided, for example, a circuit using a measurement of the voltage across capacitor C1.

There are many variations to encode/decode and modulate/demodulate communications between a transponder and a terminal.

The response time of the phase regulation loop is selected to be sufficiently long to avoid disturbing the possible retromodulation from a transponder and sufficiently short as compared with the speed at which a transponder passes in the field of the terminal. One can speak of a static regulation with respect to the modulation frequencies (for example, a 13.56-MHz frequency of the remote supply carrier and a 847.5-kHz retromodulation frequency).

An example of phase regulation terminal is described in document EP-A-0857981. The fact that the phase is regulated on the terminal side enables using current and voltage measurements in the oscillating circuit of the transponder to deduce information relative to the coupling of the transponder when it is in the field of a terminal.

Such information takes into account, in particular, the coupling between the transponder and the terminal, that is, the coefficient of the coupling between the oscillating circuit of the terminal and that of the transponder. This coupling coefficient essentially depends on the distance separating the transponder from the terminal. The coupling coefficient, designated as k, between the oscillating circuits of a transponder and of a terminal, always ranges between 0 and 1.

The position where the transponder is placed against the terminal is considered as the maximum coupling position. Indeed, the antennas of the transponder and of the terminal cannot be brought closer to each other, unless the terminal package is eliminated.

According to the described embodiments, different relations between the electric quantities measurable by the transponder in different configurations of operation with a terminal are used to automatically adapt the processing speed (rate or clock frequency) of the transponder microprocessor.

It is now known that there is an optimum coupling position, arbitrarily called $k_{opt}$, corresponding to the position at which voltage $V_{C2}$ recovered across the transponder (more specifically across its antenna) is maximum, between the terminal and the transponder. This optimum coupling position does not necessarily correspond to the maximum coupling position.

Figure 3:
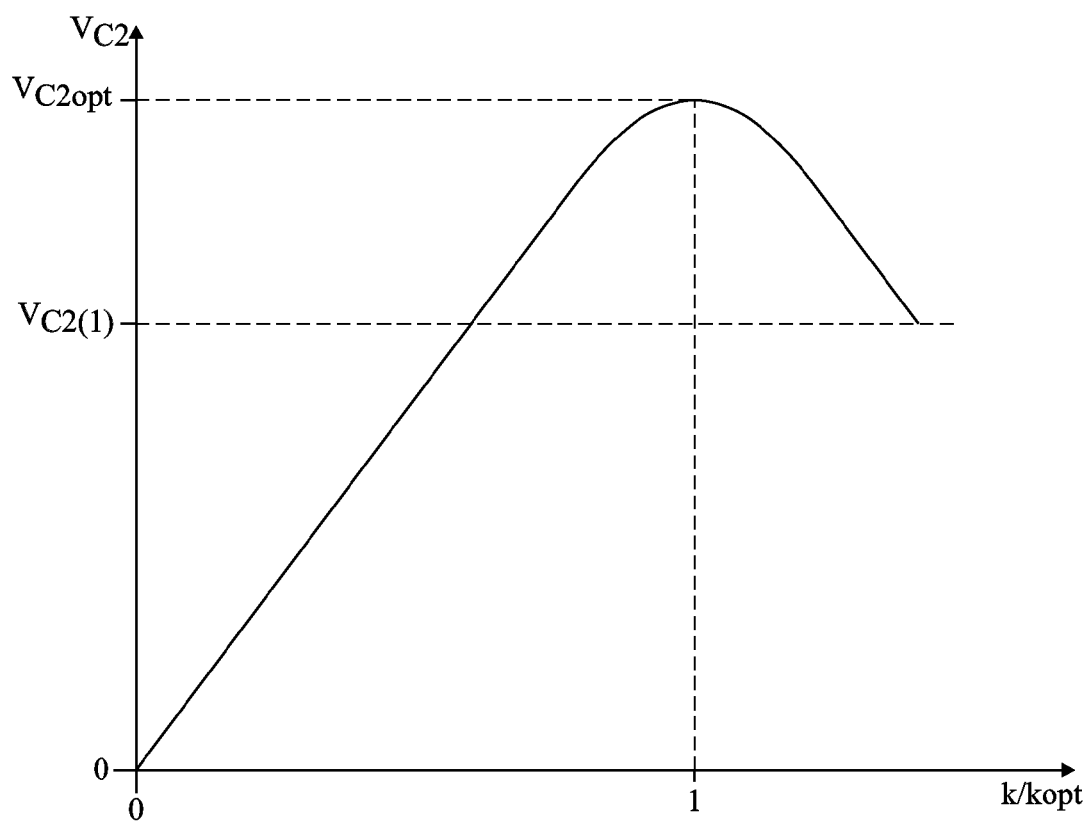
FIG. 3 illustrates an example of the variation of the voltage across the resonant circuit of the transponder according to a normalized coupling.

FIG. 3 shows an example of the shape of voltage $V_{C2}$ recovered on the transponder side according to normalized coupling $k/k_{opt}$.

The curve starts from the origin of ordinates (zero voltage) for a zero coupling. This corresponds to a distance from the transponder to the terminal such that no signal can be sensed by the transponder. Voltage $V_{C2}$ reaches a maximum $V_{C2opt}$ for an optimum coupling coefficient $k_{opt}$ ($k/k_{opt}=1$), and then decreases to an intermediate value $V_{C2(1)}$ reached at coupling 1. The maximum coupling position is at a given location of this curve, but not necessarily at the optimum coupling position. This in particular depends on the different values of the capacitive and resistive elements.

When the transponder has been brought as close to the terminal as possible by its holder, the coupling is considered to reach its maximum value, arbitrarily called $k_{max}$, in stopped position against the terminal. This stopped position may correspond either to the depositing of the transponder on the terminal antenna or to its maintaining at a distance therefrom (via the terminal package). The maximum coupling position may according to cases be lower or higher than optimum coupling position $k_{opt}$.

Relations expressing the value of voltage $V_{C2}$ according to the ratio of the current coupling to the optimum coupling and linking the value of the equivalent resistor to the load formed by the transponder elements on its own oscillating circuit have become usual. This equivalent resistor is generally called R2. Resistor R2 represents the equivalent resistor of all the circuits (microprocessor, retromodulation means, etc.) of transponder 2, placed in parallel on capacitor C2 and inductance L2 (before or after the rectifying bridge). The conductance due to the transponder circuits, and thus their power consumption, is also called "resistive load". The level of this load is symbolized by resistor R2 across the oscillating circuit. This load also depends on the clock frequency of the microprocessor, which has an influence on its consumption.

Relations linking these relative values to the coupling and to different values taken by resistance R2 are provided, for example, in document EP-A-2276643 (B9617, 09-RO-119).

It is provided to exploit these relations to adapt frequency f of microcontroller 27 (which conditions its processing speed).

For a given coupling value k, considering that the impedance of the oscillating circuit of the terminal does not vary and that the circuits remain tuned, the ratio of current coefficients k to optimum coefficients $k_{opt]R20}$ and $k_{opt]R21}$, respectively for a resistor R2 of value R20 and of value R21, may be expressed (for example, by using the relations indicated in the above-mentioned document) as follows:

$$\frac{\frac{k}{k_{opt]R20}}}{\frac{k}{k_{opt]R21}}} = \sqrt{\frac{R20}{R21}}. \quad \text{(formula 1)}$$

Still in the same conditions, the square of the ratio, noted r, of current coefficient k to optimum coefficient $k_{opt]R20}$, according to voltages $V_{C2]R20}$ and $V_{C2]R21}$ of voltage $V_{C2}$, respectively for values R20 and R21 of resistor R2, may be written as:

$$r^2 = \left(\frac{k}{k_{opt]R20}}\right)^2 = \frac{\frac{V_{C2]R21}}{V_{C2]R20}} \cdot \frac{R20}{R21} - 1}{1 - \frac{V_{C2]R21}}{V_{C2]R20}}} \quad \text{(formula 2)}$$

Formulas 1 and 2 provide:

$$\frac{V_{C2opt]R21}}{V_{C2opt]R20}} = \frac{\left(\frac{k}{k_{opt]R20}}\right)^2 + \frac{R21}{R20}}{\left(\frac{k}{k_{opt]R20}}\right)^2 + 1} \quad \text{(formula 3)}$$

To have the current coupling tend towards its critical optimum value without changing the position (distance between the transponder and the terminal), a target value of the voltage may be determined according to the following formula, obtained by considering that value R21 of formula 3 corresponds to the target transponder load:

$$V_{C2opt|target} = \left(1 + \frac{1}{\left(\frac{k}{k_{opt|R20}}\right)^2}\right) \cdot \frac{V_{C2|R20}}{2}, \quad \text{(formula 4)}$$

Figure 4:
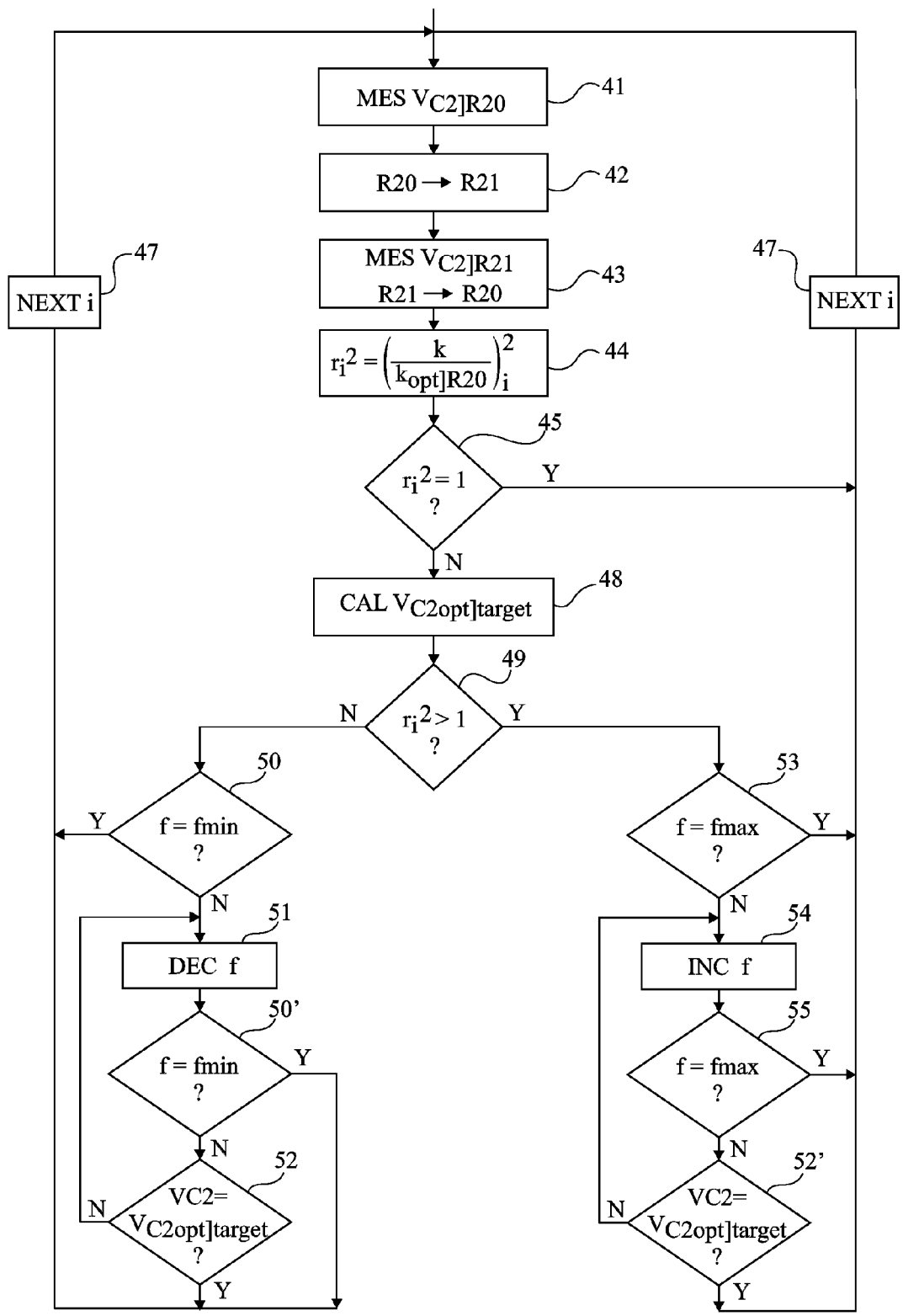
FIG. 4 is a block diagram illustrating a way to optimize the transponder clock frequency.

FIG. 4 is a simplified flowchart of an embodiment of the method for optimizing the processing speed of the transponder microprocessor.

To simplify the discussion of FIG. 4, it is still referred to values $V_{C2|R20}$ and $V_{C2|R21}$, knowing that it is in practice easier to measure values $V_{Ca|R20}$ and $V_{Ca|R21}$ of voltage $V_{Ca}$ but that this changes nothing to the comparison thresholds of the ratio of the current coupling to the optimum coupling at a given value of the resistance. Further, the calculation of a voltage target across the oscillating circuit easily translates as a voltage target across capacitor Ca.

Periodically, the transponder measures (block 41, MES $V_{C2|R20}$) and stores the voltage across capacitor C2 with a first value R20 of resistance R2.

Then (block 42, R20->R21), the value of resistive element R2 is modified to a higher value R21. As a variation, the value of resistance R2 may be decreased towards a lower value R21.

Then (block 43, MES $V_{C2|R21}$, R21->R20), the voltage across capacitor C2 is measured and stored with value R21 of resistance R2, and load R2 is modified again to return to value R20.

The current value of the ratio of coupling k to optimum value $k_{opt|R20}$ with resistance R20 (block 44, $r_i^2=(k/k_{opt|R20})^2$), is then calculated and stored. This calculation is performed, for example, according to the above formula 2.

The current ratio is then compared (block 45, $r_i^2=1$?) with one. This test amounts to determining whether the optimum coupling position has been reached. Since the value of resistor R2 depends on the microprocessor clock frequency, being in the optimum coupling position (output Y of test 45) means that no better clock frequency of the microprocessor can be used, and nothing is changed. It is then proceeded (block 47, NEXT i) to a next iteration of the measurements and it is returned to step 41.

If the position is not an optimum coupling (output N of block 45), a target value is then calculated for voltage $V_{C2}$ (block 48, CAL $V_{C2opt|target}$) according to the above formula 4.

It is then determined whether value $r_i^2$, calculated at step 44, is greater or smaller than one (block 49, $r_i^2>1$?). Test 49 could be performed before calculation 48.

If ratio $r_i^2$ is smaller than one (output N of block 49), it is determined whether clock frequency f of the microcontroller corresponds to a minimum value $f_{min}$ (block 50, $f=f_{min}$?). If it is (output Y of block 50), this means that the frequency can no longer be varied to be optimized and it is proceeded to a next iteration (block 47, NEXT i) by returning to step 41. Otherwise (output N of block 50), frequency f is decreased (block 51, DEC f) to reach, if possible, the target value calculated at block 48. This frequency decrease is performed, for example, in stages, and, for each new decrease, current value f is compared with threshold $f_{min}$ (block 50', $f=f_{min}$?) to remain within a frequency range compatible with the transponder operation. As long as this threshold has not been reached (output N of block 50'), the current value of voltage $V_{C2}$ is measured and compared with the target value (block 52, $V_{C2}=V_{C2opt|target}$). As long as this value has not been reached (output N of block 52), it is returned to the input of block 51 to continue the clock frequency decrease.

Once the target value (output Y of block 52) or minimum value $f_{min}$ of the frequency (output Y of block 50') has been reached, the transponder clock frequency can no longer be decreased, and the process is resumed at the input of block 41.

If current ratio $r_i^2$ is greater than 1 (output Y of block 49), current frequency f is compared with a maximum operation frequency threshold $f_{max}$ of the microprocessor (block 53, $f=f_{max}$?). If this threshold has been reached (output Y of block 53), it is proceeded to a next measurement (block 47) and it is returned to step 41. If not, this means that the microprocessor clock frequency can be potentially increased and that the power is sufficient. This increase is then performed (block 54, INC f) and for each increment of the value of frequency f, it is checked whether threshold $f_{max}$ has been reached. If it has (output Y of block 55), it is proceeded to the next iteration by returning to step 47. Otherwise (output N of block 45), the current value of value $V_{C2}$ is compared with the target value (block 52', $V_{C2}=V_{C2opt|target}$). If the target value has been reached, the frequency can no longer be increased and it is returned to block 47 to carry on the control according to possible subsequent variations. In the opposite case (output N of block 52'), it is returned to step 54 to carry on the frequency increase.

The process illustrated in relation with FIG. 4 results in having the maximum coupling coincide as much as possible with the optimum coupling, and thus in optimizing the speed of processing by the microprocessor at the conditions of coupling of the transponder with the terminal.

The determination of thresholds $f_{min}$ and $f_{max}$ depends on the microprocessor used.

The process described in relation with FIG. 4 has the following effect. When ratio $r_i^2$ is greater than 1, this means that the coupling is, in the curve of FIG. 3, to the right of the optimum coupling position (closer to the terminal than this position) and that by increasing the frequency, the transponder load on the terminal will be increased and the coupling will be able to be decreased. Conversely, when this ratio is smaller than 1, one is to the left of the optimum coupling position in the curve of FIG. 3 and the processing frequency should be decreased to decrease the load formed by the transponder circuits on oscillating circuit L2-C2.

Figure 5:
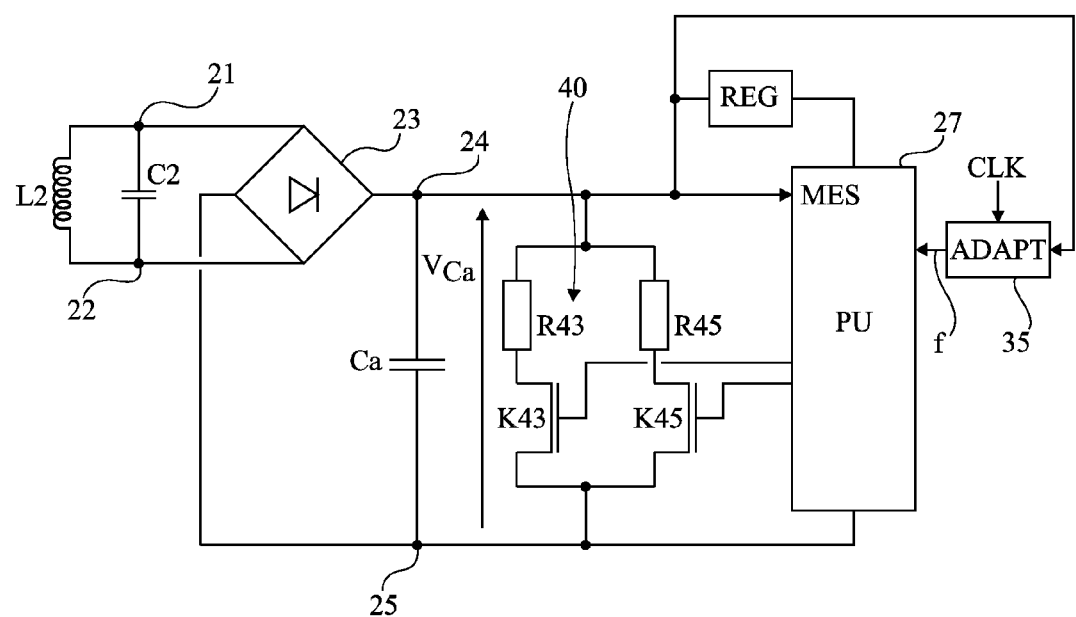
FIG. 5 is a block diagram of an embodiment of a transponder capable of controlling its clock frequency according to the coupling conditions.

FIG. 5 is a block diagram of an embodiment of a transponder 2 equipped to automatically determine, when it is in the field of a terminal (not shown), the ratio of the current coupling to the optimum coupling. The representation of FIG. 5 is simplified as compared with that of FIG. 2. In particular, the elements of demodulation, retromodulation, and for obtaining the clock frequency have not been illustrated.

FIG. 5 illustrates the presence of a switchable resistive circuit 40 between terminals 24 and 25 of rectifying bridge 3. For example, two resistors R43 and R45 are connected in parallel, each being in series with a switch K43, respectively K45. Switches K43 and K45 (for example, MOS transistors) are intended to be switched to implement the method for controlling the operating frequency of the microcontroller at the transponder position with respect to the terminal. Processing unit 27 receives information relative to voltage $V_{Ca}$ on an input MES to implement this method. In the example of FIG. 5, when both resistors R43 and R45 are functionally connected, resistor R2 (load of the transponder circuits) has value R20. The disconnection of one of the resistors (for example, resistor R43) increases the value of resistance R2 towards value R21. Other connections and switchings may be provided. For example, a single switchable resistor may be used, considering that one of the two values of resistance R2 corresponds to the resistive load of the other transponder circuits.

According to an embodiment, the switchable resistor corresponds to that used for a resistive retromodulation. A first measurement is performed by switching the retromodulation resistor so that it is functionally in the circuit (switch K30 in the on state in the example of FIG. 2). Voltage $V_{C2]R20}$ is then measured. Then, switch K30 is turned off and voltage $V_{C2]R21}$ is measured as described in relation with FIG. 4. The implementation of the described method then requires no structural modification of a transponder equipped with a microcontroller. It is sufficient to program this microcontroller so that it thus switches the retromodulation resistor.

As a variation, the increase or the decrease of the value of equivalent resistor R2 is itself caused by a variation of the operating frequency of processing unit 27. For example, to increase the value of load R2 (to decrease the power consumption), the processing frequency is decreased at most down to threshold $f_{min}$. Conversely, an increase in equivalent resistance R2 may be caused by decreasing the power consumption of unit 27 by decreasing its clock frequency.

Various embodiments have been described, and many alterations, modifications, and improvements will readily occur to those skilled in the art. In particular, the selection of limiting thresholds $f_{min}$ and $f_{max}$ and the selection of the periodicity of the measurements and iterations are within the abilities of those skilled in the art according to the application. The possible displacements of the transponder will especially be taken into account to set threshold $f_{min}$. Further, the practical implementation of the described embodiments is within the abilities of those skilled in the art based on the functional indications given hereabove and by using hardware and software tools currently present in transponders. It should be noted that the implementation of these embodiments requires no modification of the terminal and is only performed on the transponder side.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method, comprising:
   determining a ratio between data, representative of a voltage across an oscillating circuit of a transponder and obtained for two different values of a resistive load across the oscillating circuit; and
   controlling a clock frequency of a processing unit of the transponder based on the ratio, wherein the resistive load variation between said two values is obtained by varying the clock frequency of the processing unit.

2. The method of claim 1, comprising:
   comparing the ratio to one;
   increasing the clock frequency of the processing unit if said ratio is greater than one; and
   decreasing the clock frequency of the processing unit if the ratio is less than one.

3. The method of claim 1, comprising:
   comparing the ratio to a reference value; and
   when the reference value and the ratio are not equal, varying the clock frequency of the processing unit within a range defined by two thresholds.

4. The method of claim 1 wherein the values of said ratio are obtained as a result of measurements:
   of a first value of a D.C. voltage provided by a rectifier across an oscillating circuit of the transponder for a first value of the resistive load of the oscillating circuit at a first time; and
   of a second value of said voltage for a second resistive load value at a second time.

5. The method of claim 4, wherein a target value $V_{C2opt]target}$ of the voltage across the oscillating circuit is calculated according to the following formula:

$$V_{C2opt]target} = \left(1 + \frac{1}{\left(\frac{k}{k_{opt]R20}}\right)^2}\right) \cdot \frac{V_{C2]R20}}{2},$$

where:
   $V_{C2]R20}$ stands for said first value of the D.C. voltage;
   k stands for a current value of a coupling with the first resistive load value; and
   $k_{opt]R20}$ stands for a value of an optimum coupling with the first resistive load value.

6. An electromagnetic transponder comprising:
   an oscillating circuit;
   a rectifying circuit coupled to the oscillating circuit and configured to provide a D.C. voltage when the transponder is in a magnetic field of a terminal; and
   circuitry configured to control a clock frequency of a processing unit of the transponder based on:
       an indication of a voltage across the oscillating circuit under a first resistive load; and
       an indication of a voltage across the oscillating circuit under a second resistive load, different from the first resistive load, wherein the circuitry is configured to vary the clock frequency of the processing unit to generate the first and second resistive loads.

7. The transponder of claim 6 wherein the processing unit includes the circuitry.

8. The transponder of claim 6, comprising a capacitor coupled across an output of the rectifying circuit, wherein the indication of the voltage across the oscillating circuit under the first resistive load is an indication of a voltage across the capacitor.

9. The transponder of claim 6 wherein the circuitry is configured to:
   determine a ratio between the indication of a voltage across the oscillating circuit under the first resistive load and the indication of a voltage across the oscillating circuit under the second resistive load;
   compare the ratio to one;
   increase the clock frequency of the processing unit if said ratio is greater than one; and
   decrease the clock frequency of the processing unit if the ratio is less than one.

10. An electromagnetic transponder comprising:
    an oscillating circuit;
    a rectifying circuit coupled to the oscillating circuit and configured to provide a D.C. voltage when the transponder is in a magnetic field of a terminal; and
    circuitry configured to control a clock frequency of a processing unit of the transponder based on:
        an indication of a voltage across the oscillating circuit under a first resistive load; and
        an indication of a voltage across the oscillating circuit under a second resistive load, different from the first resistive load, wherein the circuitry is configured to:
    determine a ratio between the indication of a voltage across the oscillating circuit under the first resistive load and the indication of a voltage across the oscillating circuit under the second resistive load;
    compare the ratio to a reference value; and when the reference value and the ratio are not equal, vary the clock frequency of the processing unit within a range defined by two thresholds.

11. The transponder of claim 10 wherein the circuitry is configured to vary the clock frequency of the processing unit to generate the first and second resistive loads.

12. The transponder of claim 10 wherein the processing unit includes the circuitry.

13. The transponder of claim 10, comprising a capacitor coupled across an output of the rectifying circuit, wherein the indication of the voltage across the oscillating circuit under the first resistive load is an indication of a voltage across the capacitor.

14. A system, comprising:
   one or more inputs configured to receive:
      an indication of a voltage across an oscillating circuit of a transponder under a first resistive load; and
      an indication of a voltage across the oscillating circuit of the transponder under a second resistive load, different from the first resistive load; and
   control circuitry coupled to the one or more inputs and configured to generate one or more signals to control a clock frequency of a processor of the transponder based on the indication of the voltage across the oscillating circuit of the transponder under the first resistive load and the indication of the voltage across the oscillating circuit of the transponder under the second resistive load, wherein the control circuitry is configured to generate one or more control signals to vary the clock frequency of the processor to generate the first and second resistive loads.

15. The system of claim 14, comprising the processor.

16. The system of claim 14, comprising:
   a rectifying circuit; and
   a capacitor coupled across an output of the rectifying circuit, wherein the indication of the voltage across the oscillating circuit under the first resistive load is an indication of a voltage across the capacitor.

17. The system of claim 14 wherein the control circuitry is configured to:
   determine a ratio between the indication of the voltage across the oscillating circuit under the first resistive load and the indication of the voltage across the oscillating circuit under the second resistive load;
   compare the ratio to one;
   increase the clock frequency of the processing unit if said ratio is greater than one; and
   decrease the clock frequency of the processing unit if the ratio is less than one.

* * * * *